(12) United States Patent
Hendriks

(10) Patent No.: US 8,345,377 B2
(45) Date of Patent: Jan. 1, 2013

(54) AERODYNAMIC DEVICE DIRECTING PRESSURIZED AIRFLOW TO PORTS IN THE DEVICE FOR AEROSTATIC SEALING IN A HARD DISK DRIVE(HDD)

(75) Inventor: Ferdinand Hendriks, Morgan Hill, CA (US)

(73) Assignee: HGST, Netherlands B.V., Amsterdam (NL)

( * ) Notice: Subject to any disclaimer, the term of this patent is extended or adjusted under 35 U.S.C. 154(b) by 387 days.

(21) Appl. No.: 12/648,969

(22) Filed: Dec. 29, 2009

(65) Prior Publication Data

US 2011/0157744 A1  Jun. 30, 2011

(51) Int. Cl.
*G11B 33/14* (2006.01)

(52) U.S. Cl. .................. 360/97.13; 360/97.15

(58) Field of Classification Search ..... 360/97.12–97.18
See application file for complete search history.

(56) References Cited

U.S. PATENT DOCUMENTS

| | | | |
|---|---|---|---|
| 3,720,931 A | 3/1973 | Anderson | |
| 3,846,835 A * | 11/1974 | Horovitz et al. | 360/97.16 |
| 4,268,878 A | 5/1981 | Kearns | |
| 4,488,193 A * | 12/1984 | Davis et al. | 360/97.16 |
| 4,583,213 A | 4/1986 | Bracken et al. | |
| 4,835,333 A | 5/1989 | Kocal | |
| 5,179,483 A | 1/1993 | Lowe | |
| 5,872,768 A | 2/1999 | Shtipelman et al. | |
| 6,788,493 B1 * | 9/2004 | Subramaniam et al. | 360/97.15 |
| 6,791,790 B2 | 9/2004 | Lee | |
| 7,166,142 B2 | 1/2007 | Tuma et al. | |
| 7,535,670 B2 * | 5/2009 | Fan et al. | 360/97.13 |
| 2007/0097545 A1 | 5/2007 | Yoo et al. | |
| 2008/0055773 A1 | 3/2008 | Nigam | |
| 2009/0002879 A1 | 1/2009 | Abe et al. | |

FOREIGN PATENT DOCUMENTS

JP  59084386  5/1984

OTHER PUBLICATIONS

Cho, et al., "Local Heat Transfer Characteristics in HDD with Ventilation Hub", *IEEE*, (2004),1-2.

* cited by examiner

*Primary Examiner* — Allen Heinz

(57) ABSTRACT

An aerodynamic device for aerostatic sealing in a hard disk drive (HDD) including an exterior surface configured to modify airflow in the HDD and proximate at least one magnetic disk and an inlet port configured to receive pressurized airflow. The aerodynamic device also includes a plurality of outlet ports disposed on the exterior surface configured to discharge the pressurized airflow directly onto the at least one magnetic disk and aerostatically seal the aerodynamic device with the at least one magnetic disk.

12 Claims, 6 Drawing Sheets

AERODYNAMIC DEVICE DIRECTING PRESSURIZED AIRFLOW TO PORTS IN THE DEVICE FOR AEROSTATIC SEALING IN A HARD DISK DRIVE(HDD)

CROSS-REFERENCE TO RELATED APPLICATION

U.S. patent application Ser. No. 12/649,097 entitled Air Pump in a Hard Disk Drive (HDD), by Ferdinand Hendriks, assigned to the assignee of the present invention, filed Dec. 29, 2009, and which is incorporated by reference in its entirety herein.

FIELD

Embodiments of the present technology relate generally to the field of hard disk drives.

BACKGROUND

Airflow caused by the rotation of disks in a hard disk drive (HDD) causes turbulence which can deleteriously affect the read/write function of the HDD. Conventional technology attempts to limit the velocity of the airflow within the HDD, especially in the region of the read/write head, by placing aerodynamic parts (e.g., diverters, spoilers, damper plates, etc.) in close proximity and/or in between to the disks. However, there must always be a clearance between the aerodynamic part and the disks, because the disks will fail if any part within the HDD physically contacts the disks. Moreover, passive clearances often occupy as much as 50% of the disk/disk clearance or the disk/cover and disk/base casting clearance.

The drawings referred to in this description should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

In general, aerodynamic parts are configured to deflect, block, seal or otherwise inhibit airflow in the disk and actuator region and consequently reduce turbulence in the disk and actuator region. There must always be a clearance between the disks and the aerodynamic parts because the disks can fail if the aerodynamic parts come into physical contact with the disks. However, the necessary clearance (a gap between the aerodynamic part and the disks) provides a poor seal between the aerodynamic parts and the disks because there is considerable leakage.

Figure 1:
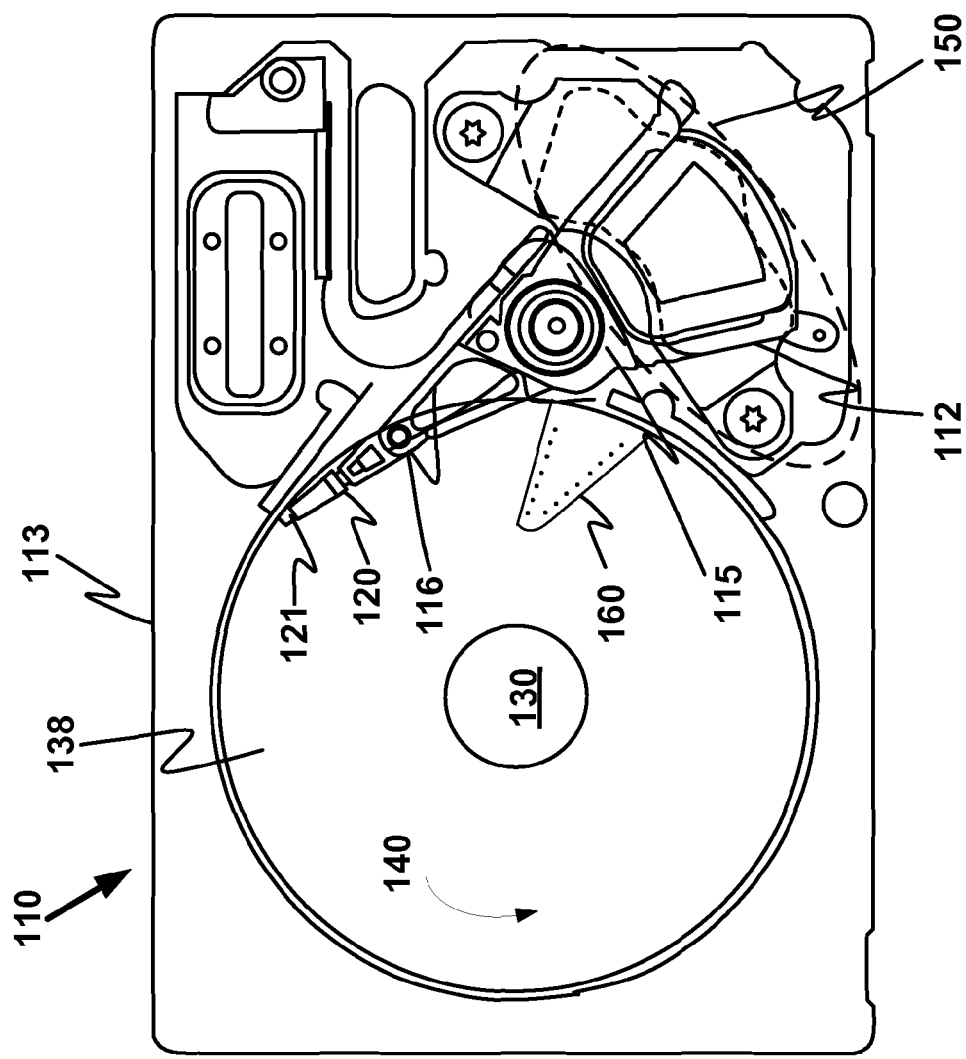
FIG. 1 illustrates an example of a HDD, in accordance with an embodiment of the present invention.

With reference now to FIG. 1, a schematic drawing of one embodiment of an information storage system including a magnetic hard disk file or HDD 110 for a computer system is shown, although only one head and one disk surface combination are shown. What is described herein for one head-disk combination is also applicable to multiple head-disk combinations. In other words, the present technology is independent of the number of head-disk combinations.

In general, HDD 110 has an outer housing 113 usually including a base portion (shown) and a top or cover (not shown). In one embodiment, housing 113 contains a disk pack having at least one media or magnetic disk 138. The disk pack (as represented by disk 138) defines an axis of rotation and a radial direction relative to the axis in which the disk pack is rotatable.

A spindle motor assembly having a central drive hub 130 operates as the axis and rotates the disk 138 or disks of the disk pack in the circumferential direction 140 relative to housing 113. An actuator assembly 115 includes one or more actuator arms 116. When a number of actuator arms 116 are present, they are usually represented in the form of a comb that is movably or pivotally mounted to base/housing 113. A controller 150 is also mounted to base 113 for selectively moving the actuator arms 116 relative to the disk 138. Actuator assembly 115 may be coupled with a connector assembly, such as a flex cable to convey data between arm electronics and a host system, such as a computer, wherein HDD 110 resides.

In one embodiment, each actuator arm 116 has extending from it at least one cantilevered integrated lead suspension (ILS) 120. The ILS 120 may be any form of lead suspension that can be used in a data access storage device. The level of integration containing the slider 121, ILS 120, and read/write head is called the Head Gimbal Assembly (HGA).

The ILS 120 has a spring-like quality, which biases or presses the air-bearing surface of slider 121 against disk 138 to cause slider 121 to fly at a precise distance from disk 138. ILS 120 has a hinge area that provides for the spring-like quality, and a flexing cable-type interconnect that supports read and write traces and electrical connections through the hinge area. A voice coil 112, free to move within a conventional voice coil motor magnet assembly is also mounted to actuator arms 116 opposite the head gimbal assemblies. Movement of the actuator assembly 115 by controller 150 causes the head gimbal assembly to move along radial arcs across tracks on the surface of disk 138.

In one embodiment, HDD includes an upstream spoiler 160 (with aerostatic seals) for modifying air flow generated by the rotation of disks 138 and for creating an aerostatic seal between itself and the disks 138.

Figure 2:
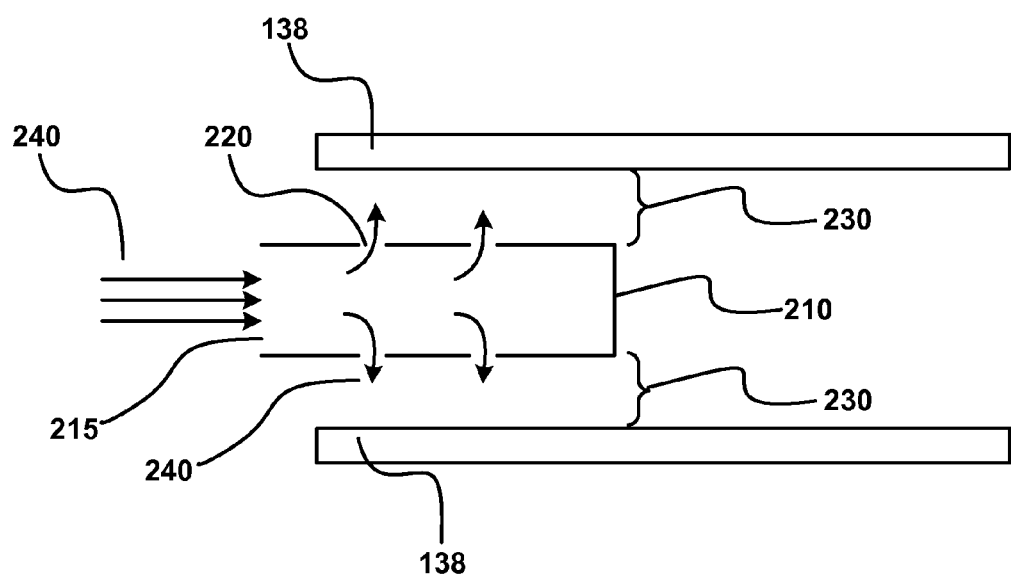
FIG. 2 illustrates an example of aerostatic sealing, in accordance with an embodiment of the present invention.

Aerodynamic Devices for Aerostatic Sealing FIG. 2 illustrates aerodynamic device 210 for aerostatic sealing in a HDD, in accordance with an embodiment of the present invention. FIG. 2 depicts an aerodynamic device 210 for modifying air flow generated by the rotation of disks 138 and for creating an aerostatic seal between itself and the disks 138. Aerodynamic device 210 includes an inlet port 215 configured to receive pressurized air flow 240 and a plurality of outlet ports 220 arranged between data recording regions of the respective storage disks 138 and configured to discharge the pressurized air flow 240 from within the aerodynamic device.

In various embodiments, aerodynamic device 210 is any aerodynamic device configured to modify airflow in the HDD and located proximate at least one disk in the HDD. For example, aerodynamic device 210 is a damper plate that is disposed between two disks. Aerodynamic device 210 can be a diverter which diverts airflow away (e.g., to a bypass channel) from the disk region. Aerodynamic device can be a spoiler (e.g., upstream or downstream). In one embodiment, aerodynamic device can be disposed in between at least two disks of a plurality of disks. In another embodiment, aerodynamic device is disposed in between all of the disks in the HDD. In further embodiments, a plurality of aerodynamic devices are disposed in between at least two disks of a plurality of disks or disposed in between all of the disks in the HDD.

The pressurized air 240 that exits outlet ports 220 is discharged directly at the disks 138. The pressurized air 240 discharged in the direction of disks 138 increases the drag of the aerodynamic device and causes an aerostatic seal 230 between the aerodynamic device 210 and the disks 138. An aerostatic seal 230 is a non-contact seal. In other words, the discharged pressurized air 240 directed at the disks 138 allows for a mechanical clearance between the aerodynamic device 210 and the disks 138 while also sealing the clearance. For example, turbulent air outside the disk region is prohibited by the aerostatic seal 230 from leaking past the disks and/or in between the disks through the clearance. Likewise, stable air flow in between the disks 138 is sealed in between the disks by the aerostatic seal 230. Thus, making the HDD aerodynamic parts more effective.

It should be appreciated that any number of outlet and inlet ports 220 can be formed in any orientation on the aerodynamic device 210. For example, outlet ports 220 can discharge pressurized air 240 orthogonal to the data surface of the disks 138. In another embodiment, outlet ports 220 can discharge pressurized air 240 parallel the data surface of the disks. It should be appreciated that the outlet ports can discharge pressurized air 240 at any angle with respect to the data surface of the disks.

The pressurized air flow 240 is generated inside the HDD. In one embodiment, the pressurized air flow 240 is generated by a pressure difference inside the HDD. For example, pressurized airflow 240 can travel from a location of high pressure to the inlet port 215, via ducting, if the pressure at the inlet port 215 is lower than that at the location of high pressure. In another embodiment, the pressurized air flow 240 is generated by an air pump inside the HDD, which is described in detail below. It should also be appreciated that a suction (e.g., flow from the outlet ports 220 to the inlet port 215) through the outlet ports 220 also creates an aerostatic seal 230 between the aerodynamic device 210 and disks 138.

Figure 3:
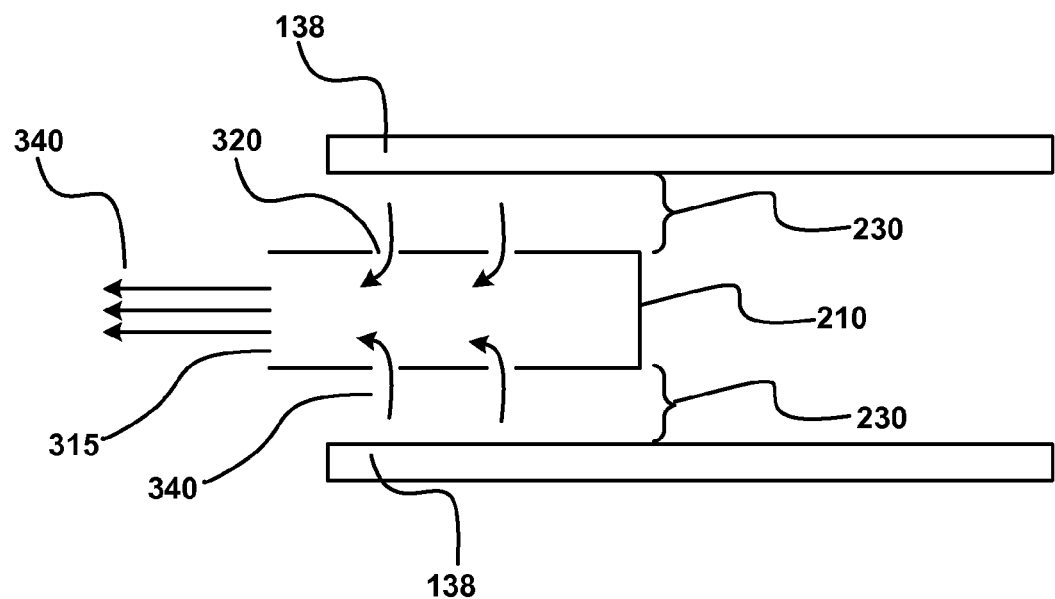
FIG. 3 illustrates an example of aerostatic sealing, in accordance with an embodiment of the present invention.

FIG. 3 illustrates aerodynamic device 210 for aerostatic sealing in a HDD, in accordance with an embodiment of the present invention. It should be appreciated that the only difference between FIG. 3 and FIG. 2 is that air is sucked through inlet ports 320 compared to being discharged through outlet ports 220 of FIG. 2. Accordingly, the aerostatic sealing illustrated in FIG. 3 is accomplished by an opposite flow of air through aerodynamic device 210 as compared to FIG. 2. In other words, aerostatic sealing is accomplished by air being suctioned or vacuumed into intake ports 320 and the suctioned air exits output port 315. Therefore, aerostatic seal 230 is accomplished by vacuum pressure 340 that vacuums or sucks air into inlet ports 320 and out of outlet port 315.

Air Pump Inside HDD

Figure 4:
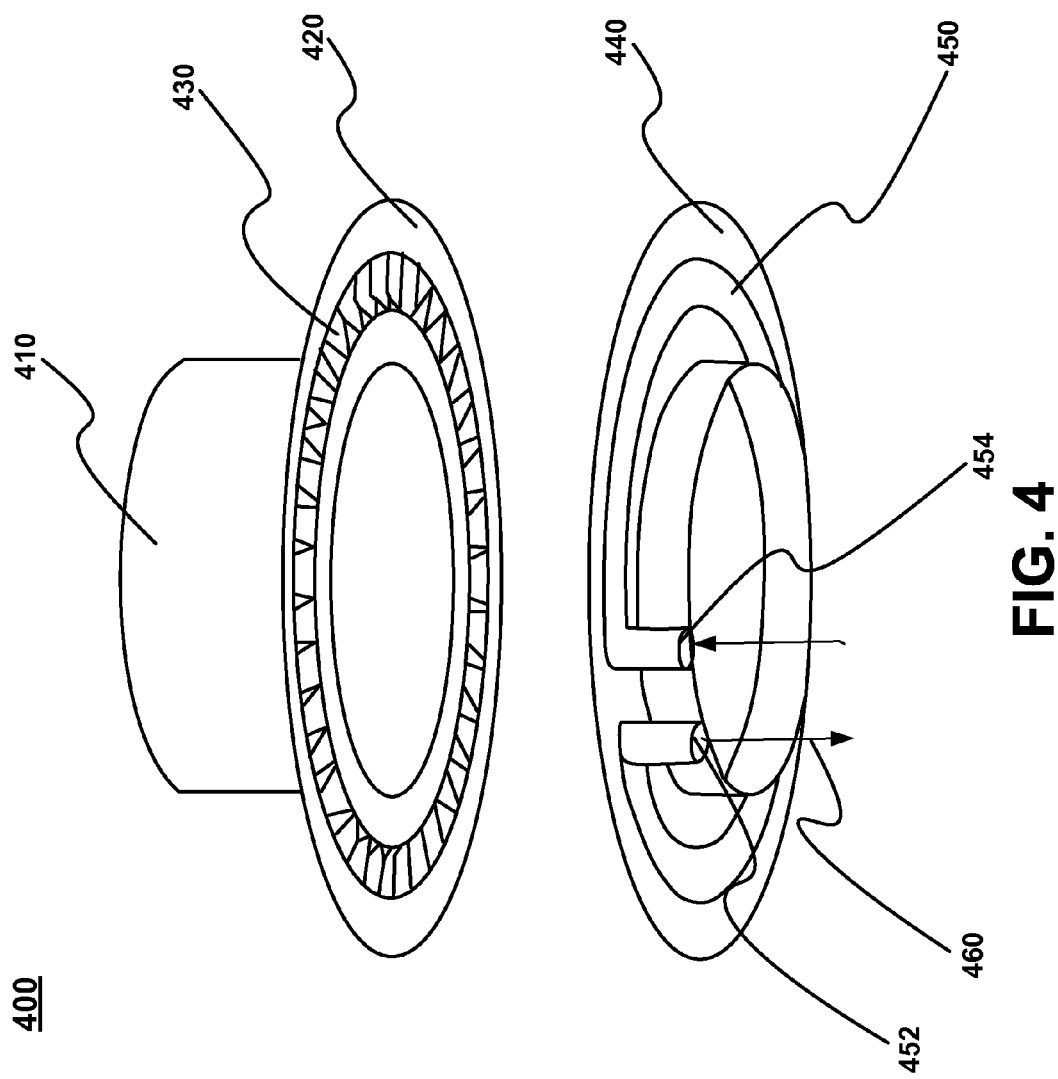
FIG. 4 illustrates an example of an air pump, in accordance with an embodiment of the present invention.
Figure 5:
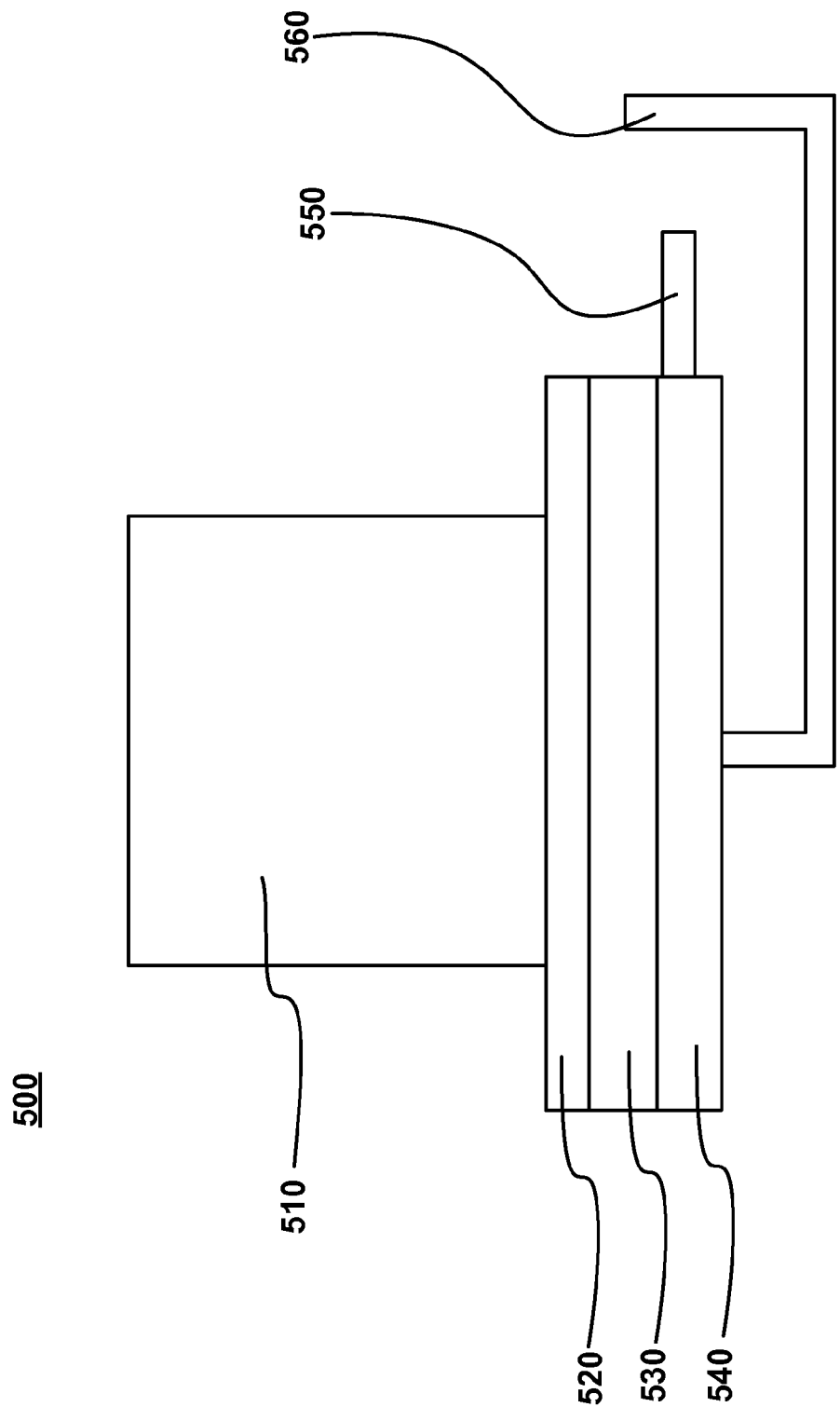
FIG. 5 illustrates an example of an air pump, in accordance with an embodiment of the present invention.
Figure 6:
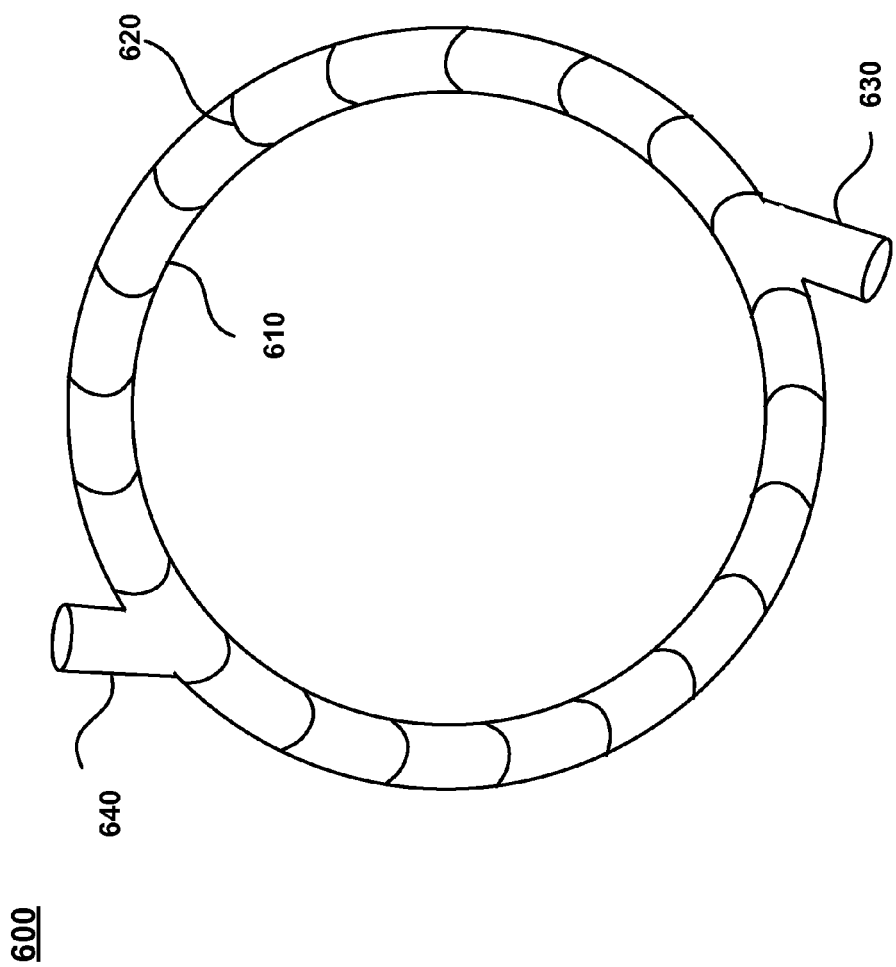
FIG. 6 illustrates an example of an air pump, in accordance with an embodiment of the present invention.

FIGS. 4-6 illustrate an air pump that generates air pressure, in accordance with an embodiment of the present invention. In various embodiments, the air pumps can be run in reverse and create a vacuum or suction pressure. FIG. 4 shows an exploded view of motor 400 that includes a motor spindle or rotor 410 and a base or stator 440. For purposes of brevity and clarity, only features applicable for the generation of air pressure in the HDD are included. Rotor 410 includes an air pressure generating feature. For example, pocketed region 420 of the rotor 410 includes a series of pockets 430 circumscribing the pocketed region. The stator 440 includes a continuous channel 450 circumscribing the pocketed region of the stator. The channel 450 includes an inlet port 454 and an outlet port 452.

The series of pockets 430 is opposed to the channel 450. The channel 450 is an air pressure generating feature that corresponds to pockets 430. Accordingly, as the rotor 410 rotates with respect to stator 440, the pockets 430 entrain air through the inlet port 454. The air in each pocket 430 progressively becomes compressed as it travels along the channel 450. As the pockets of compressed air passes over the outlet port 452, the pressurized air in the pockets discharges through the outlet port 452. The pressurized air 460 can be delivered to any part of the HDD via ducting. In one embodiment, pressurized air 460 is 500 to 2000 Pascals (Pa) or 50 to 200 millimeters (mm) $H_2O$. The pockets 430 can be any shape (e.g., scallop) that allows for air to circulate through the pockets and subsequently become compressed and exit the outlet port 452. It should be appreciated that the air pressure is generated at a location where the air pressure generating feature of the rotor rotates in proximity to the air pressure generating feature of the stator.

The clearance between the rotor 410 and the stator 440 can also cause leakage and accordingly loss of pressure. Leakage can be minimized by techniques such as but not limited to labyrinth seals. In one embodiment, the clearance between the rotor and the stator in the labyrinth region is 0.2 mm.

In one embodiment, the rotor 410 and stator 440, in combination, act as a regenerative disk or friction pump. The pressure created by the regenerative disk or friction pump can cause an axial force on the rotor which is approximately equal to the average pressure on the stator 440. It should also be appreciated that the rotor 410 and stator 440, can work in reverse.

FIG. 5 depicts an air pump 500, in accordance with an embodiment of the present invention. Air pump 500 includes a motor spindle or rotor 510, a base or stator 540, anti-vibration coupling 520 and wobbler 530. In one embodiment, rotor 510 is a fluid dynamic bearing (FDB). Wobbler 530 is configured to convert the rotary motion of the rotor 510 into an orbiting motion. Anti-vibration coupling 520 is configured to reduce vibration during the conversion of rotary motion into orbiting motion. In general, the wobbler 530 and the stator 540 have corresponding interleaved scrolls (not shown) that pump, compress, or pressurize air that is provided at intake 550. It should be appreciated that the rotor 510 and wobbler 530, in combination, includes an air pressure generating feature (e.g., scroll). Also, the stator includes an air generating feature (e.g., scroll). Often, one of the scrolls is fixed, while the other orbits eccentrically without rotating, thereby trapping and pumping or compressing pockets of fluid between the scrolls. The vane geometry of the scrolls (not shown) may be involute, archimedean spiral, or hybrid curves. It should be appreciated that the air pressure is generated at a location where the air pressure generating feature of the wobbler orbits in proximity to the air pressure generating feature of the stator.

Balancing of the motor 500 can be accomplished by operating two opposing pumps. In one embodiment, air pump 500 is a scroll pump. It should be appreciated that pressurized air generated by air pump 500 can be delivered to any part of the HDD via ducting. In one embodiment, the pressurized air is 500 to 2000 Pa or 50 to 200 mm $H_2O$.

FIG. 6 depicts an air pump 600, in accordance with an embodiment of the present invention. Air pump 600 includes a rotor 610. In one embodiment, rotor 610 is a FDB. Rotor 610 includes an air pressure generating feature. For example, a plurality of buckets 610 circumscribing the rotor 610. As rotor 610 rotates, the plurality of buckets 620 collects air. In one embodiment, air is collected through inlet port 640, is pressurized and discharged out of outlet port 630. In one embodiment, air pump 600 is a Pelton wheel. The pressurized air generated by air pump 600 can be delivered to any part of the HDD via ducting.

In one embodiment, the pressurized air is 500 to 2000 Pa or 50 to 200 mm $H_2O$. It should be appreciated that the air pressure is generated at a location where the air pressure generating feature of the rotor rotates in proximity to the air pressure generating feature of the stator.

The air pressure created by air pumps depicted in FIGS. 4-6 can be directed via ducting to anywhere inside the HDD. In one embodiment, the air pressure is the pressurized air flow 240 utilized to create the aerostatic seals 230, as described above. The air pumps, as with most pumps, can work in reverse. In one embodiment, the air pressure created by the air pumps depicted in FIGS. 4-6 is a vacuum pressure (e.g., 340) utilized to create the aerostatic seals 230, as described above.

Moreover, air pressure created within the HDD can also be used for levitation of components inside the HDD. Typically, a slider 121 travels over a load/unload ramp (not shown) when moving from a resting position to a read/write position over the disk. In one embodiment, air pressure can be directed to the slider 121, via ducting, as the slider travels over the load/unload ramp and thereby levitating the slider 121. Accordingly, the levitation of the slider 121 will reduce friction and thereby reduce any vibrations due to the friction of the load/unload ramp.

Various embodiments of the present invention are thus described. While the present invention has been described in particular embodiments, it should be appreciated that the present invention should not be construed as limited by such embodiments, but rather construed according to the following claims.

The invention claimed is:

1. An aerodynamic device for aerostatic sealing in a hard disk drive (HDD) comprising:
an exterior surface of said device being positioned in a space between data recording regions of two disks of said HDD and configured to modify airflow in said hard disk drive and proximate at least one magnetic disk;
an inlet port configured to receive pressurized airflow; and
a plurality of outlet ports disposed in said exterior surface configured to discharge said pressurized airflow directly onto said at least one magnetic disk and aerostatically seal said aerodynamic device with said at least one magnetic disk.

2. The device of claim 1, wherein said plurality of outlet ports on said exterior surface configured to discharge said pressurized airflow directly onto a plurality of disks and aerostatically seal said aerodynamic device with said plurality of disks.

3. The device of claim 1, wherein at least two of said plurality of outlet ports discharge said pressurized airflow in opposite directions.

4. The device of claim 1, wherein said aerodynamic device is selected from a group consisting of: upstream spoiler, downstream spoiler, slit shroud, diverter, damper plate or disk shroud.

5. The device of claim 1, wherein said pressurized airflow is produced by an air pump in said hard disk drive.

6. The device of claim 1, wherein said pressurized airflow is produced by a pressure difference in said hard disk drive.

7. A hard disk drive comprising:
a pair of magnetic disks;
an aerodynamic device disposed proximate to said pair of magnetic disks configured to modify airflow in said hard disk drive, said aerodynamic device comprising:
an exterior surface configured to modify airflow in said hard disk drive and proximate said pair of magnetic disks;
an inlet port configured to receive pressurized airflow; and
a plurality of outlet ports disposed in said exterior surface configured to discharge said pressurized airflow directly onto said pair of magnetic disks and aerostatically seal said aerodynamic device with said pair of magnetic disks, wherein said plurality of outlet ports are disposed between data recording regions of said pair of magnetic disks.

8. The hard disk drive of claim 7, wherein said plurality of outlet ports on said exterior surface configured to discharge said pressurized airflow directly onto a plurality of disks and aerostatically seal said aerodynamic device with said plurality of disks.

9. The device of claim 7, wherein at least two of said plurality of outlet ports discharge said pressurized airflow in opposite directions.

10. The device of claim 7, wherein said aerodynamic device is selected from a group consisting of: upstream spoiler, downstream spoiler, slit shroud, diverter, damper plate or disk shroud.

11. The device of claim 7, wherein said pressurized airflow is produced by an air pump in said hard disk drive, wherein said air pump is integrated with a spindle.

12. The device of claim 7, wherein said pressurized airflow is produced by a pressure difference in said hard disk drive.

* * * * *